US012659689B2

(12) United States Patent
Chung et al.

(10) Patent No.: US 12,659,689 B2
(45) Date of Patent: Jun. 16, 2026

(54) METHOD AND APPARATUS FOR PROVIDING LOCATION-BASED SERVICE IN DYNAMIC ROAD NETWORK

(71) Applicant: AJOU UNIVERSITY INDUSTRY—ACADEMIC COOPERATION FOUNDATION, Suwon-si (KR)

(72) Inventors: Tae-Sun Chung, Seongnam-si (KR); Aavash Bhandari, Suwon-si (KR)

(73) Assignee: Ajou University Industry-Academic Cooperation Foundation, Suwon-si (KR)

( * ) Notice: Subject to any disclaimer, the term of this patent is extended or adjusted under 35 U.S.C. 154(b) by 656 days.

(21) Appl. No.: 18/061,112

(22) Filed: Dec. 2, 2022

(65) Prior Publication Data

US 2023/0179949 A1     Jun. 8, 2023

(30) Foreign Application Priority Data

Dec. 3, 2021     (KR) ......................... 10-2021-0172164

(51) Int. Cl.
*G06F 16/00*          (2019.01)
*G06F 16/29*          (2019.01)
              (Continued)
(52) U.S. Cl.
CPC ............ *H04W 4/021* (2013.01); *G06F 16/29* (2019.01); *G06F 16/9027* (2019.01);
              (Continued)
(58) Field of Classification Search
CPC .. H04W 4/021; H04W 4/029; G06Q 30/0205; G06Q 30/0266–0267;
              (Continued)

(56) References Cited

U.S. PATENT DOCUMENTS 7,155,339 B2 * 12/2006 Tu ........................... G01C 21/34
                                                            701/426
8,015,125 B2 * 9/2011 Regli ...................... G06T 19/00
                                                            706/12
(Continued)

FOREIGN PATENT DOCUMENTS

EP            3674914 A1 * 7/2020
KR      10-2020-0016544 A      2/2020
              (Continued)

OTHER PUBLICATIONS

Xiaoxue Zhang et al., "Implementation of smartphone seamless positioning system based on mobile navigation electronic map", 2016 Fourth International Conference on Ubiquitous Positioning, Indoor Navigation and Location Based Services (UPINLBS), Jan. 2017, pp. 89-93.*

(Continued)

*Primary Examiner* — Srirama Channavajjala
(74) *Attorney, Agent, or Firm* — Knobbe, Martens, Olson & Bear, LLP

(57)               ABSTRACT

Provided are a method and apparatus for providing a location-based service (LBS) in a dynamic road network, which include, according to an LBS request signal received from at least one user terminal, generating a query object based on location information of the user terminal; searching for at least one data object located within a threshold radius based on the user terminal; generating a cluster including at least one query object based on at least one node; comparing distances between boundary query objects and an inner query object based on the generated cluster and calculating a nearest neighbor for each query object; and identifying the data object associated with the calculated nearest neighbor.

8 Claims, 9 Drawing Sheets

(51) Int. Cl.

| | |
|---|---|
| *G06F 16/901* | (2019.01) |
| *G06F 16/909* | (2019.01) |
| *G06F 16/9537* | (2019.01) |
| *G06Q 30/00* | (2023.01) |
| *G06Q 30/0204* | (2023.01) |
| *H04W 4/021* | (2018.01) |
| *H04W 4/029* | (2018.01) |

(52) U.S. Cl.
CPC ........ *G06F 16/909* (2019.01); *G06F 16/9537* (2019.01); *G06Q 30/0205* (2013.01); *H04W 4/029* (2018.02)

(58) Field of Classification Search
CPC ..... G06Q 30/02; G06F 16/9537; G06F 16/29; G06F 16/909; G06F 16/9027
See application file for complete search history.

(56) References Cited

U.S. PATENT DOCUMENTS

| | | | | |
|---|---|---|---|---|
| 9,188,985 | B1 * | 11/2015 | Hobbs | G01C 21/3682 |
| 10,331,753 | B1 * | 6/2019 | Zhang | G06F 16/9027 |
| 10,710,603 | B2 * | 7/2020 | Beaurepaire | G01C 21/3815 |
| 11,194,807 | B2 * | 12/2021 | Zhang | G06F 16/248 |
| 11,729,066 | B2 * | 8/2023 | Ohlsson | H04L 41/14 |
| 2004/0151130 | A1 * | 8/2004 | Beshai | H04L 45/025 |
| | | | | 370/254 |
| 2010/0070509 | A1 * | 3/2010 | Li | G06F 16/41 |
| | | | | 707/747 |
| 2010/0305842 | A1 * | 12/2010 | Feng | G06F 16/9537 |
| | | | | 701/533 |
| 2010/0332131 | A1 * | 12/2010 | Horvitz | G01C 21/3697 |
| | | | | 701/414 |
| 2012/0215806 | A1 * | 8/2012 | Pryakhin | G06F 16/322 |
| | | | | 707/769 |
| 2014/0082062 | A1 * | 3/2014 | Bellver | G06F 16/9537 |
| | | | | 709/203 |
| 2015/0377637 | A1 * | 12/2015 | Tanizaki | G01C 21/34 |
| | | | | 701/533 |

| | | | | |
|---|---|---|---|---|
| 2016/0069699 | A1 * | 3/2016 | Chen | G01C 21/3682 |
| | | | | 701/426 |
| 2016/0342677 | A1 * | 11/2016 | Nuchia | G06F 16/285 |
| 2016/0356608 | A1 * | 12/2016 | Dong | G01S 19/50 |
| 2017/0011091 | A1 * | 1/2017 | Chehreghani | G06F 16/2455 |
| 2017/0120928 | A1 * | 5/2017 | Ohara | B60W 30/143 |
| 2017/0255645 | A1 * | 9/2017 | Varoglu | G06F 16/9535 |
| 2019/0390972 | A1 * | 12/2019 | Jiao | G01C 21/367 |

FOREIGN PATENT DOCUMENTS

| | | | |
|---|---|---|---|
| KR | 10-2020-0086529 A | | 7/2020 |
| KR | 10-2021-0114381 A | | 9/2021 |
| WO | WO 2009/002020 A2 * | 12/2008 | |
| WO | WO 2009/113385 A1 * | 9/2009 | |
| WO | WO2009121299 A1 * | 10/2009 | |
| WO | WO 2010111118 A1 * | 9/2010 | |
| WO | WO 2016153435 A1 * | 9/2016 | |
| WO | WO 2018126285 A1 * | 7/2018 | |

OTHER PUBLICATIONS

Jiajia Li et al., "Efficient Multi-Request Route Planning on Road Network", 2020 IEEE Intl Conf on Parallel & Distributed Processing with Applications, Big Data & Cloud Computing, Sustainable Computing & Communications, Social Computing & Networking, 2020, pp. 617-624.*

Hyo-Kyun Kim et al., "All Nearest Neighbors Query Including Scores Road Network", 2020 International Conference on Computational Science and Computational Intelligence (CSCI) (Dec. 2020, pp. 1423-1424).*

Office Action dated Jan. 2, 2024 in Korean Application No. 10-2021-0172164, in 6 pages.

Office Action dated Mar. 8, 2024 in Korean Application No. 10-2021-0172164, in 4 pages.

Bhandari et al., "Efficient Processing of All Nearest Neighbor Queries in Dynamic Road Networks", *Mathematics*, May 17, 2021, vol. 9, 21 pages.

* cited by examiner

10

200

| Condition | dist(q,d) |
|---|---|
| $d \in D^{q_i} \cap D^{q_j} \cap D\left(\overline{q_iq_j}\right)$ | $dist(q,d) = min\left\{len(q,q_i) + dist(q_i,d), len(q,q_j) + dist(q_j,d), len(q,d)\right\}$ |
| $d \in D^{q_i} \cap D^{q_j} - D\left(\overline{q_iq_j}\right)$ | $dist(q,d) = min\left\{len(q,q_i) + dist(q_i,d), len(q,q_j) + dist(q_j,d), len(q,d)\right\}$ |
| $d \in D^{q_i} \cap D\left(\overline{q_iq_j}\right) - D^{q_j}$ | $dist(q,d) = min\left\{len(q,q_i) + dist(q_i,d), len(q,d)\right\}$ |
| $d \in D^{q_j} \cap D\left(\overline{q_iq_j}\right) - D^{q_i}$ | $dist(q,d) = min\left\{len(q,q_j) + dist(q_j,d), len(q,d)\right\}$ |
| $d \in D^{q_i} - \left(D^{q_j} \cup D\left(\overline{q_iq_j}\right)\right)$ | $dist(q,d) = len(q,q_i) + dist(q_i,d)$ |
| $d \in D^{q_j} - \left(D^{q_i} \cup D\left(\overline{q_iq_j}\right)\right)$ | $dist(q,d) = len(q,q_j) + dist(q_j,d)$ |
| $d \in D\left(\overline{q_iq_j}\right) - \left(D^{q_i} \cup D^{q_j}\right)$ | $dist(q,d) = len(q,d)$ |

FIG. 6

| $\overline{q_i q_j}$ | $q_i$ | $q_j$ | $D^{q_i}$ | $D^{q_j}$ | $D\left(\overline{q_i q_j}\right)$ | $\{q_{i+1} \ldots q_{j-1}\}$ | $D^{q_i} \cup D^{q_j} \cup D\left(\overline{q_i q_j}\right)$ |
|---|---|---|---|---|---|---|---|
| $\overline{q_1 q_5 q_4}$ | $q_1$ | $q_4$ | $\{d_1\}$ | $\{d_2\}$ | $D\left(\overline{q_1 q_5 q_4}\right) = \varnothing$ | $\{q_5\}$ | $\{d_1, d_2\}$ |
| $\overline{q_2 q_3}$ | $q_2$ | $q_3$ | $\{d_4\}$ | $\{d_4\}$ | $D\left(\overline{q_2 q_3}\right) = d_4$ | $\varnothing$ | irrelevant |
| $q_6$ | $q_6$ | $q_6$ | $\{d_3\}$ | $\{d_3\}$ | $D(q_6) = \varnothing$ | $\varnothing$ | irrelevant |

FIG. 8

$$dist(q_5, d_1) = 3 \quad for$$
$$d_1 \in D^{q_1} - (D^{q_4} \cup D\,(\overline{q_1 q_5 q_4}))$$

$$dist(q_5, d_3) = 9 \quad for$$
$$d_2 \in D^{q_1} \cap D^{q_4} - D\,(\overline{q_1 q_5 q_4})$$

METHOD AND APPARATUS FOR PROVIDING LOCATION-BASED SERVICE IN DYNAMIC ROAD NETWORK

CROSS-REFERENCE TO RELATED APPLICATION

This application claims priority to and the benefit of Korean Patent Application No. 10-2021-0172164, filed on Dec. 3, 2021, the disclosure of which is incorporated herein by reference in its entirety.

BACKGROUND

1. Field

The present disclosure relates to a method and apparatus for providing a location-based service in a dynamic road network.

2. Discussion of Related Art

A location-based service (LBS) is a wireless communication service that identifies the location of a movable object and provides required information according to the identify location. LBSs are rapidly becoming popular and applied to Global Positioning System (GPS) supporting devices, such as smart phones, wireless sensor networks, and navigation systems.

Through an LBS, a user searches for a point of interest (POI) near the user, calls a shared vehicle, such as a taxi, Uber, or the like, or uses a vehicle calling service for ride sharing. Such services typically use a nearest neighbor (NN) method for a road network. The NN method indexes a large number of query objects related to a location and a distance, and thus is suitable for one-time evaluation. In the case of using the NN method, there is a need to regenerate all indexes from the beginning whenever a location update occurs after a specific time has elapsed, which leads to a huge computational burden. Therefore, the NN method is not suitable for a dynamic road network due to the computational overhead. Therefore, there is a need to develop a technology which provides an LBS by ensuring minimum calculation overhead and cost in a dynamic road network in which a moving distance and a moving time vary according to various traffic conditions.

The disclosure of this section is to provide background information relating to the present disclosure. Applicant does not admit that any information contained in this section constitutes prior art.

SUMMARY

The present disclosure is directed to providing a method and apparatus for providing an LBS in a dynamic road network that are capable of ensuring minimum overhead and cost when calculating a shortest path in a dynamic road network in which a moving distance and a moving time vary according to various traffic conditions.

The technical objectives of the present disclosure are not limited to the above, and other objectives may become apparent to those of ordinary skill in the art based on the following descriptions.

According to an aspect of the present disclosure, there is provided a method of providing an LBS, the method including: according to an LBS request signal received from at least one user terminal, generating a query object based on location information of the user terminal; searching for at least one data object located within a threshold radius based on the user terminal; generating a cluster including at least one query object based on at least one node; comparing distances between boundary query objects and an inner query object based on the generated cluster and calculating a nearest neighbor for each query object; and identifying the data object associated with the calculated nearest neighbor.

The generating of the cluster may include: searching a road network of a road on which the user terminal is located; and generating one or more node clusters based on an intermediate node other than an intersection node or an end node according to a result of searching the road network.

The generating of the cluster may include grouping at least one query object located in the same node cluster among the node clusters, to generate a query object cluster.

The calculating of the nearest neighbor may include: identifying boundary query objects in the generated query object cluster; identifying an inner query object in the generated query object cluster; and calculating the nearest neighbor for a boundary query object having a shortest distance to the inner query object.

The calculating of the nearest neighbor may include: identifying a number of query objects included in the query object cluster; when the identified query object includes a plurality of query objects, calculating a partial join result set for each of the plurality of query objects; and performing a union on the calculated partial join result sets to calculate the nearest neighbor.

The identifying of the data object may include: identifying a vehicle terminal corresponding to the calculated nearest neighbor as the data object; and transmitting information about the vehicle terminal to the user terminal.

The generating of the query object may include acquiring a snapshot of a road network within a threshold radius based on a location of the user terminal according to the LBS request signal.

According to an aspect of the present disclosure, there is provided an apparatus for providing an LBS, the apparatus including: a communication unit configured to receive an LBS request signal from at least one user terminal; and a control unit configured to search for at least one data object located within a threshold radius from at least one query object generated based on location information of the at least one user terminal, compare distances between boundary query objects and an inner query object in a cluster generated using the at least one query object to calculate a nearest neighbor for each query object, and identify the data object associated with the calculated nearest neighbor.

The control unit may search a road network of a road on which the user terminal may be located, and to generate one or more node clusters based on an intermediate node other than an intersection node or an end node.

The control unit may group at least one query object located in the same node cluster among the node clusters, and to generate a query object cluster.

The control unit may be configured to identify a boundary query object and an inner query object in the generated query object cluster, and calculate the nearest neighbor of a boundary query object having a shortest distance to the inner query object.

The control unit may be configured to, when there are a plurality of query objects included in the query object cluster, calculate partial join result sets for each of the plurality of query objects, and perform a union on the calculated partial join result sets to calculate the nearest neighbor.

The control unit may be configured to identify a vehicle terminal corresponding to the calculated nearest neighbor as the data object, and transmit information about the vehicle terminal to the user terminal.

The control unit may acquire a snapshot of a road network within a threshold radius based on a location of the user terminal according to the LBS request signal.

BRIEF DESCRIPTION OF THE DRAWINGS

The above and other objects, features and advantages of the present disclosure will become more apparent to those of ordinary skill in the art by describing embodiments thereof in detail with reference to the accompanying drawings, in which:

FIGS. 5A-5C, 6-8, and 9A-9B show diagrams for describing a method of evaluating a query according to an embodiment of the present disclosure.

DETAILED DESCRIPTION OF EMBODIMENTS

Figure 1:
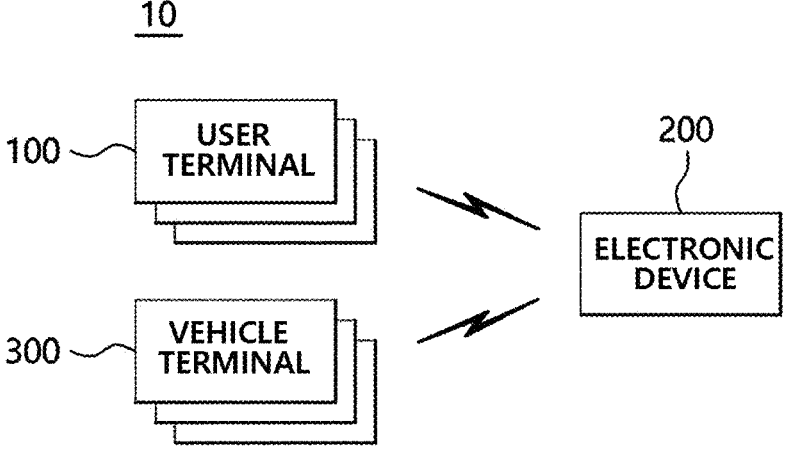
FIG. 1 is a diagram illustrating a system for providing an LBS according to an embodiment of the present disclosure.

Hereinafter, embodiments according to the present disclosure will be described in detail with reference to the accompanying drawings. The following detailed description set forth below in conjunction with the accompanying drawings is intended to illustrate embodiments of the disclosure and is not intended to represent the only embodiments in which the disclosure may be practiced. In the drawings, parts irrelevant to the description may be omitted for the clarity of explanation, and like numbers refer to like elements throughout the description of the drawings.

Terms used in the present disclosure are defined as shown in Table 1 below.

TABLE 1

| notation | Meaning |
|---|---|
| q | a query object ($q \in Q$) |
| d | a data object ($d \in D$)) |
| $n_l n_{l+1} \ldots n_m$ | a node sequence $\overline{N}$ between two nodes $n_l$ and $n_m$ in a road network with a path between the two nodes $n_l$ and $n_m$, in which $n_l$ and $n_m$ denote intersection nodes or end nodes, and nodes other than $n_l$ and $n_m$ are intermediate nodes |
| $q_i q_{i+1} \ldots q_j$ | a query sequence $\overline{Q}$ generated from query objects $q_i$, $q_{i+1}, \ldots q_j$ on the same node |
| $D(\overline{q_i q_j})$ | a set of data objects in a query object cluster $(\overline{q_i q_j})$ |
| $D^q$ | a set of data objects closest to a query object q at each d |
| dist(q, d) | The shortest path distance between a data object and a query object |
| len(q, d) | a distance of a line segment connecting q and d, when q and d lie on the same line segment |

In addition, in an embodiment of the present disclosure, an al nearest neighbor (ANN) query of a road network returns all pairs of all query objects each having the nearest data object corresponding thereto. This may be expressed as in Equation 1 below.

$$Q \circledast D = \{ \langle q, d \rangle \ | \forall q \in Q, \forall d \in D^q \} \qquad \text{[Equation 1]}$$

On the assumption that for two different object sets Q and D, $Q = \{q_1, q_2, \ldots, q_n\}$ and $D = \{d_1, d_2, \ldots, d_m\}$, an ANN query may return pairs of objects from Q and D as sets such that D is the nearest neighbor of Q.

FIG. 1 is a diagram illustrating a system for providing a location-based service (LBS) according to an embodiment of the present disclosure.

Referring to FIG. 1, a system 10 according to the present disclosure may include a plurality of user terminals 100, an electronic device 200, and a plurality of vehicle terminals 300.

The user terminal 100 may be a terminal carried by a user who desires to use an LBS, and may be a portable electronic device, such as a smart phone or the like. The user terminal 100 may be, for example, a terminal capable of calling a shared vehicle, a taxi or the like that can pick up passengers. When the user terminal 100 desires to use an LBS, the user terminal 100 identifies the location of the user terminal 100 and transmits the identified location to the electronic device 200. To this end, the user terminal 100 may communicate with the electronic device 200 using wireless communication, such as 5th generation communication (5G), Long Term Evolution (LTE), Long Term Evolution-Advanced (LTE-A), wireless fidelity (Wi-Fi), and the like.

The electronic device 200 may be a device capable of providing the user terminal 100 and the vehicle terminal 300 with an LBS, such as a server. The electronic device 200 identifies the location of the user terminal 100 based on a request signal for an LBS received from the user terminal 100. The electronic device 200 identifies the location of the vehicle terminal 300 located within a threshold radius based on the identified location of the user terminal 100. The electronic device 200 may reflect various external environments, such as the identified location of the user terminal 100, the location of the vehicle terminal 300, traffic conditions, and the like, to identify the vehicle terminal 300 that may most rapidly access the location of the user terminal 100. The electronic device 200 transmits information about the identified vehicle terminal 300 to the user terminal 100 and transmits information about the user terminal 100 to the vehicle terminal 300 such that the vehicle terminal 300 accesses the location of the user terminal 100. Operations of the electronic device 200 for the above described operation will be described in more detail with reference to FIG. 2 below.

The vehicle terminal 300 may be, for example, a terminal provided in a vehicle, such as a shared vehicle or a taxi capable of carrying passengers, and may be an electronic device, such as a smart phone or an LBS-providing terminal for a vehicle. The vehicle terminal 300 transmits location information of the vehicle terminal 300 to the electronic device 200 in real time or periodically through an LBS. To this end, the vehicle terminal 300 may communicate with the electronic device 200 using wireless communication, such as 5G, LTE, LTE-A, Wi-Fi, and the like.

Figure 2:
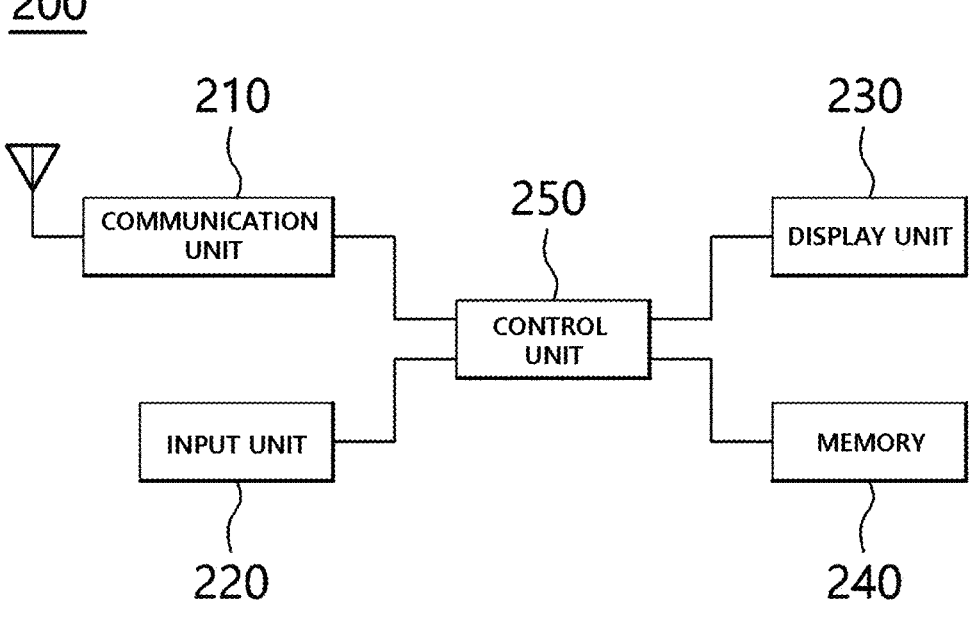
FIG. 2 is a diagram illustrating main components of an electronic device providing an LBS according to an embodiment of the present disclosure.

FIG. 2 is a diagram illustrating main components of an electronic device providing an LBS according to an embodiment of the present disclosure.

Referring to FIG. 2, the electronic device 200 providing an LBS may include a communication unit 210, an input unit 220, a display unit 230, a memory 240, and a control unit 250.

The communication unit 210 communicates with the user terminal 100 and the vehicle terminal 300. Upon receiving an LBS request signal from the user terminal 100, the communication unit 210 provides the LBS request signal to the control unit 250. In addition, when the control unit 250 identifies information about the vehicle terminal 300 that may most rapidly access the location of the user terminal 100, the communication unit 210 may transmit the information of the corresponding vehicle terminal 300 to the user terminal 100 and transmit information about the user terminal 100 to the vehicle terminal 300. To this end, the communication unit 210 may communicate with the user terminal 100 and the vehicle terminal 300 using wireless communication, such as 5G, LTE, LTE-A, Wi-Fi, and the like.

The input unit 220 generates input data in response to a user input to the electronic device 200. To this end, the input unit 220 may include input devices, such as a keyboard, a mouse, a keypad, a dome switch, a touch panel, a touch key, a button, and the like.

The display unit 230 outputs output data according to the operation of the electronic device 200. To this end, the display unit 230 may include a display device, such as a liquid crystal display (LCD), a light emitting diode (LED) display, an organic LED (OLED) display, or the like. In addition, the display unit 230 in combination with the input unit 220 may be implemented in the form of a touch screen.

The memory 240 stores a program configured to control the electronic device 200 to identify the vehicle terminal 300 located at the shortest distance based on the location of the user terminal 100 or capable of accessing the user terminal 100 most rapidly. In addition, the memory 240 may store map data capable of identifying a road network within a threshold radius based on the location of the user terminal 100.

The control unit 250, upon receiving a request signal for receiving an LBS from the user terminal 100 through the communication unit 210, identifies location information of the user terminal 100, and acquires a snapshot of a road network within a threshold radius based on the identified location information. The control unit 250 generates a query object. In this case, the query object includes a query location of the user terminal 100 that has transmitted the request signal and a time at which the request signal was received. The control unit 250 searches for a data object closest to the query object using the generated query object. In this case, the data object may be a vehicle terminal 300 for picking up a user carrying the user terminal 100.

The control unit 250 investigates the road network and clusters same node segments, that is, all nodes in which an intermediate node is included. In this case, the node clustering is performed only once and may be used for snapshots acquired at a later time. The control unit 250 searches for query objects located in the same node cluster and groups the query objects together with the node cluster to generate a query object cluster.

The control unit 250 evaluates a nearest neighbor (NN) query at a boundary of each of the generated query object clusters. The NN results generated for all query object clusters are used to compare the distance between an inner query object and a boundary query object when the size of the query object cluster is greater than or equal to 3. The result of a boundary query object may be assigned to an inner query object nearest to the boundary query object. The control unit 250 transmits a result set including a data object closest to each query object, which is identified as a result of the NN query evaluation, to the user terminal 100.

Figure 3:
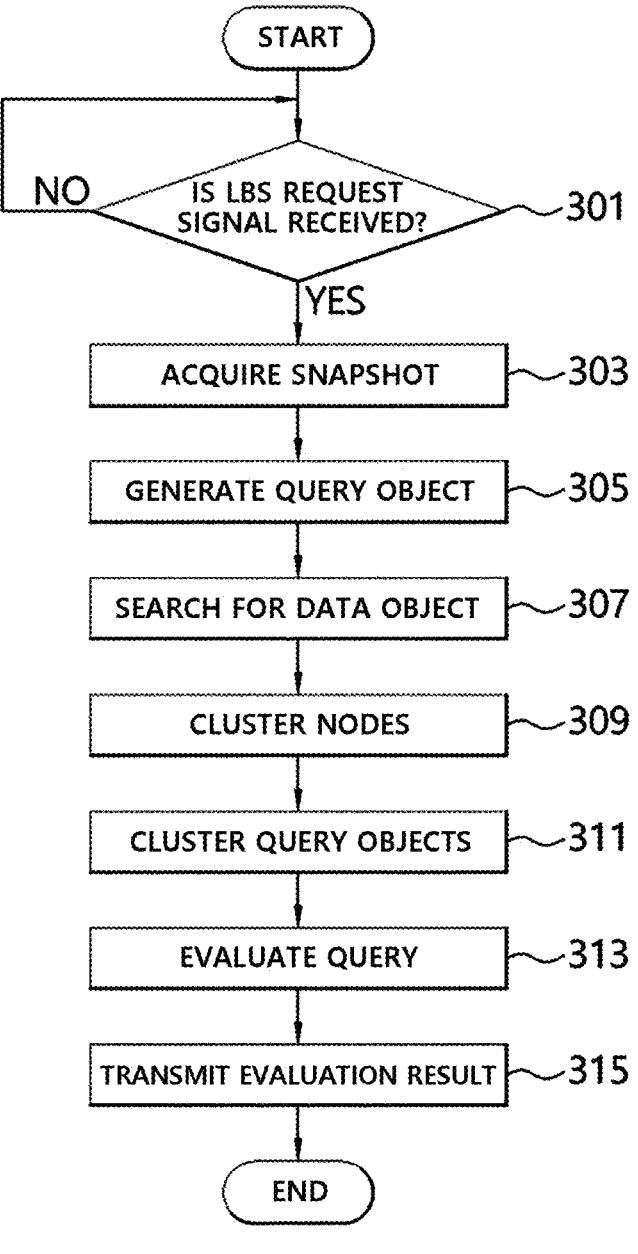
FIG. 3 is a flowchart for describing a method of providing an LBS in a dynamic road network according to an embodiment of the present disclosure.

FIG. 3 is a flowchart for describing a method of providing an LBS in a dynamic road network according to an embodiment of the present disclosure.

Referring to FIG. 3, in operation 301, the control unit 250 checks whether a request signal for receiving an LBS is received from the user terminal 100 through the communication unit 210. When the request signal is found through operation 301 to have been received, the control unit 250 performs operation 303, and the request signal is found through operation 301 not to have been received, the control unit 250 waits to receive the request signal.

In operation 303, the control unit 250 identifies location information of the user terminal 100, and acquires a snapshot of a road network within a threshold radius based on the identified location information. In operation 305, the control unit 250 generates a query object. In this case, the query object includes a query location of the user terminal 100 that has transmitted the request signal and a time at which the request signal was received. In addition, when request signals are received from a plurality of user terminals 100 at the same time, the control unit 250 may generate a plurality of query objects. In operation 307, the control unit 250 searches for a data object closest to the generated query object. In this case, the data object may be a vehicle terminal 300 for picking up a user carrying the user terminal 100.

Subsequently, in operation 309, the control unit 250 investigates the road network and clusters same node segments, that is, all nodes in which an intermediate node is included. In this case, the node clustering is performed only once and may be used for snapshots acquired at a later time. In operation 311, the control unit 250 searches for query objects located in the same node cluster, and groups the query objects together with the node cluster to generate a query object cluster. The clustering method performed in operations 309 and 311 in this case will be described in more detail with reference to FIGS. 4A and 4B below.

In operation 313, the control unit 250 evaluates an NN query at a boundary of each of the generated query object clusters to calculate a nearest neighbor for each query object. The NN results generated for all query object clusters are used to compare the distance between an inner query object and a boundary query object when the size of the query object cluster is greater than or equal to 3. The result of a boundary query object may be assigned to an inner query object nearest thereto. A method of evaluating an NN query performed in operation 313 in this case will be described in more detail using FIGS. 5A-5C, 6 and 7 below.

Subsequently, in operation 315, the control unit 250 transmits a result set including data objects closest to each query object to the user terminal 100.

Figure 4A:
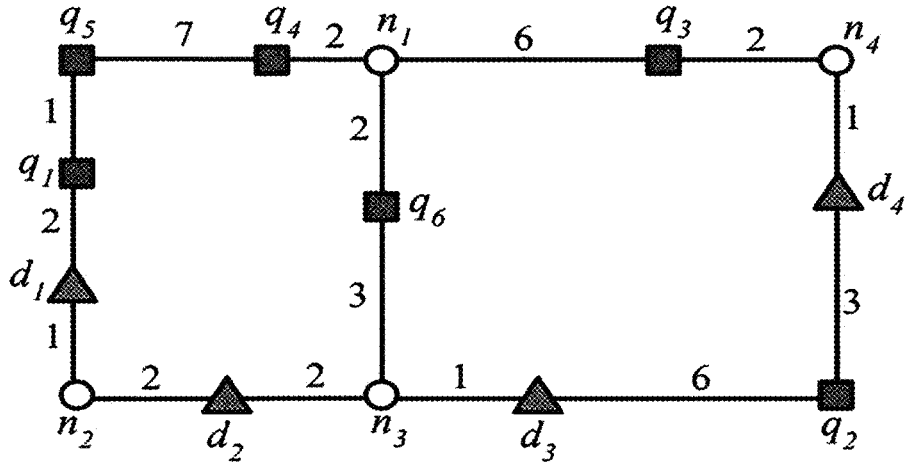
FIGS. 4A and 4B show diagrams for describing a clustering method according to an embodiment of the present disclosure.
Figure 4B:
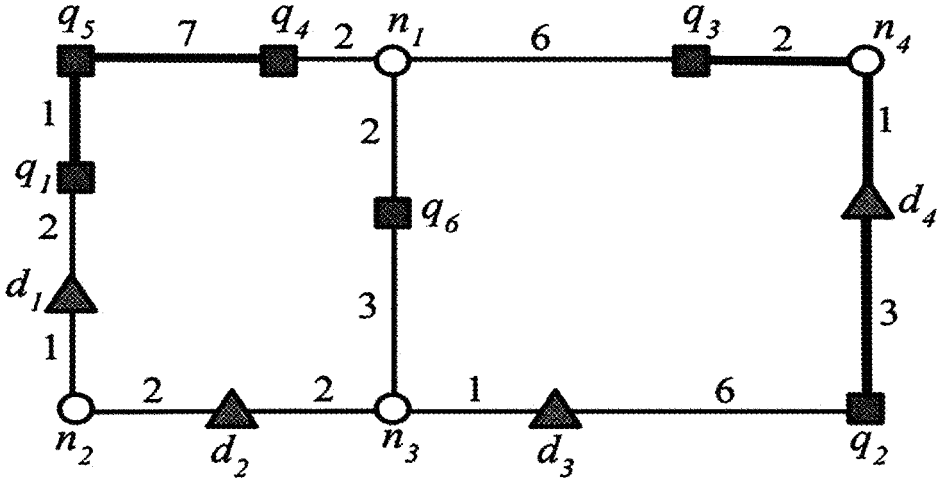

FIGS. 4A and 4B show diagrams for describing a clustering method according to an embodiment of the present disclosure.

Referring to FIGS. 3 and 4A-4B, clustering involves grouping data elements belonging to the same category. In the present disclosure, node clustering and query object clustering are performed as in operation 309 and operation 311 of FIG. 3, respectively. FIG. 4A illustrates node clusters of a road network, and by performing node clustering of a road network, node sequences such as $\overline{n_1 n_2 n_3}, \overline{n_1 n_4 n_3}, \overline{n_1 n_3}$ may be generated.

In addition, FIG. 4B illustrates a method of clustering query objects in the same node sequence. Referring to FIG. 4B, six query objects $q_1 \sim q_6$ and four data objects $d_1 \sim d_4$ may be present in a road network identified from a snapshot. When there are two object sets (i.e., $Q=q_1,q_2,q_3,q_4,q_5,q_6$ and $D=d_1,d_2,d_3,d_4$) query objects $q_1,q_5,q_4$ in a node sequence $\overline{n_1 n_2 n_3}$ are clustered into $\overline{q_1 q_5 q_4}$, query objects $q_2,q_3$ in a node sequence $\overline{n_1 n_4 n_3}$ are clustered into $\overline{q_2 q_3}$, and a query object $q_6$ in a node sequence $\overline{n_1 n_3}$ is clustered into $\overline{q_6}$ alone. In FIG.

4B, thick lines represent query object clusters. Thus, the query object set ($Q=q_1,q_2,q_3,q_4,q_5,q_6$) is converted to $\overline{Q}=\overline{q_1q_5q_4q_2q_3},\overline{q_6}$. In this case, Q denotes a query object cluster set.

As described above, generation of node sequences through node clustering is directly related to generation of query object clusters. More specifically, the control unit 250 identifies whether a node is an intersection node or an end node. When the node is an intersection node or an end node, the control unit 250 continues searching for a path to an adjacent node until an intermediate node is identified. Through such a search, the control unit 250 may generate a node sequence $\overline{N}$.

In addition, the control unit 250 searches for a query object in each node sequence. The control unit 250 may group the found query objects to generate $\overline{Q}$, that is, a final set of query object clusters.

FIGS. 5A-5C, 6-8, and 9A-9B show diagrams for describing a method of evaluating a query according to an embodiment of the present disclosure.

Referring to FIGS. 3, 4A-4B, 5A-5C, 6-8, and 9A-9B, as in operation 313 of FIG. 3, the control unit 250 is configured to, for NN query evaluation at the boundary of each query object cluster, evaluate up to two NN queries for queries $q_i$ and $q_j$ located on the boundary of a query object cluster $\overline{q_iq_{i+1}...q_j}$. In addition, the control unit 250 evaluates NN for other query objects $q_{i+1} \cdots q_{j-1}$ located inside the query object cluster $\overline{q_iq_{i+1}...q_j}$. In this case, data objects may be retrieved only by comparing the distance between an inner query object and a boundary query object and allocating a data object to a boundary query object closest to the inner query object. Accordingly, in the present disclosure, there is no need to perform iteration on inner query objects.

Figure 5A:
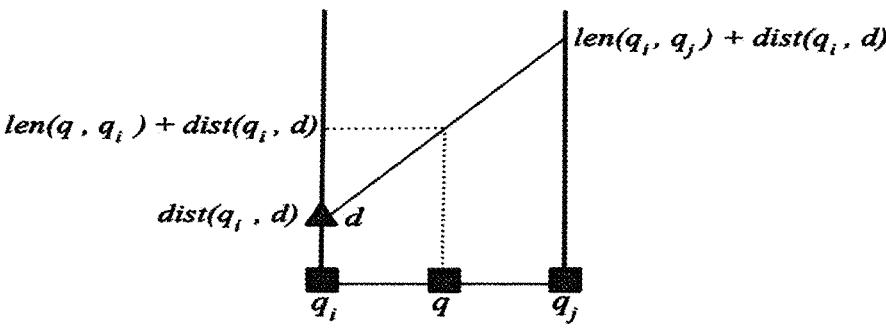
Figure 5B:
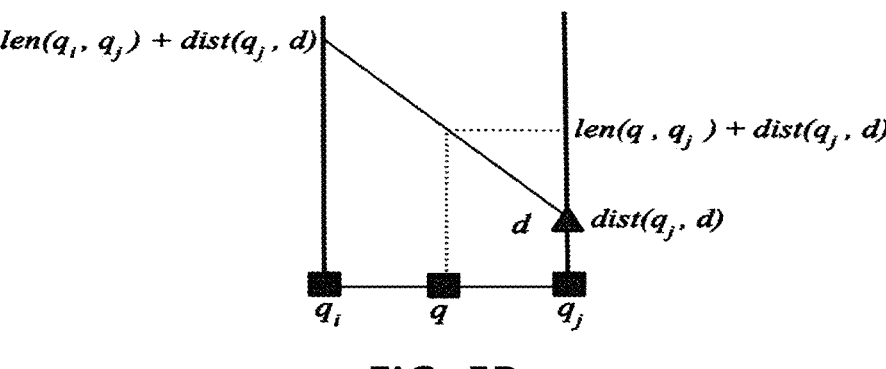
Figure 5C:
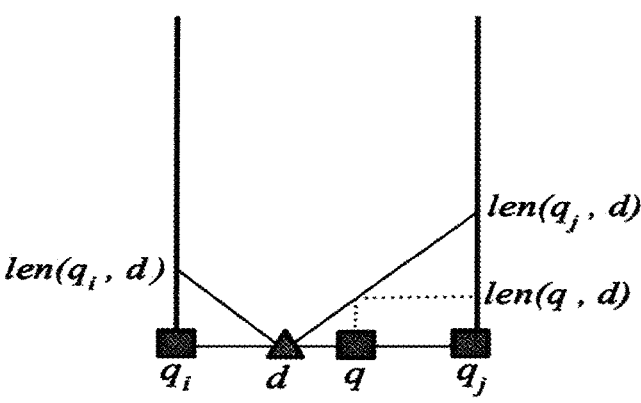

FIGS. 5A-5C show diagrams illustrating conditions for calculating a distance from a query object to a data object.

More specifically, FIG. 5A is a graph showing that $dist(q_i,d)=len(q,q_i)+dist(q_i,d)$ with $d \in D^{q_i}$ FIG. 5B is a graph showing that $dist(q_j,d)=len(q,q_j)+dist(q_j,d)$ with $d \in D^{q_j}$, and FIG. 5C is a graph showing that $dist(q,d)=len(q,d)$ with $d \in (\overline{q_iq_j})$.

In this case, for each query object $q \in \overline{q_iq_j}$, a subset $D^{q_i} \cup D^{q_j} \cup D(\overline{q_iq_j})$ is present. Here, $D^{q_i}(D^{q_j})$ denotes a set of data objects closest to a query object $q_i$ or $g_j$, and $D(\overline{q_iq_j})$ denotes a set of data objects in a query object cluster $\overline{q_iq_j}$. In addition, FIG. 6 is a diagram illustrating conditions for evaluating $dist(q,d)$ for $q \in \overline{q_iq_j}$ and $d \in D^{q_i} \cup D^{q_j} \cup D(\overline{q_iq_j})$. In this case, $D^{q_j}$ ar and $D^{q_i}$ may belong to a data object set $D(\overline{q_iq_j})$. In addition, searching for the closest data objects in the data object set $D^{q_i}(D^{q_j})$ is more important than searching in a data object set in $D(\overline{q_iq_j})$.

In addition, the control unit 250 may search for a data object closest to a query object using three different cases in consideration of the number of query objects in a query object cluster. The first case may be when $|\overline{q_iq_j}|$ is 1, the second case may be when $|\overline{q_iq_j}|$ is 2, and the third case may be when $|\overline{q_iq_j}|$ is greater than or equal to 3.

In the first case, an NN query $NN\_Query(q_i)$ may be evaluated at a query object $q_i$, in which case the query object cluster $\overline{q_iq_j}$ may only be composed of $q_i$. The control unit 250 may calculate a result for $q_i$. In the second case, NN queries $NN\_Query(q_i)$ and $NN\_Query(q_i)$ may be evaluated at query objects $q_i$ and $q_i$, respectively. The control unit 250 may calculate partial join result sets for each of the query objects $q_i$ and $q_i$, and perform a union on the calculated partial join result sets to output an NN query result. In the third case, two NN queries are evaluated, and a search for the closest data object is performed on query objects $q_i$ and $q_j$. For each of the query objects, a nearest neighbor set $q \in \{q_{i+1} \cdots q_{j-1}\}$ is extracted. The control unit 250 may perform a union on partial join result sets extracted from $D^{q_i} \cup D^{q_j} \cup D(\overline{q_iq_j})$, to output an NN query result.

Figure 7:
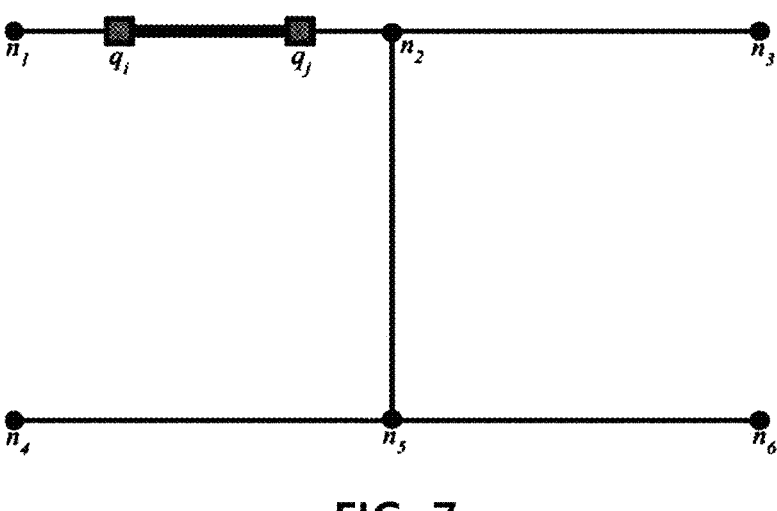
Figure 9A:
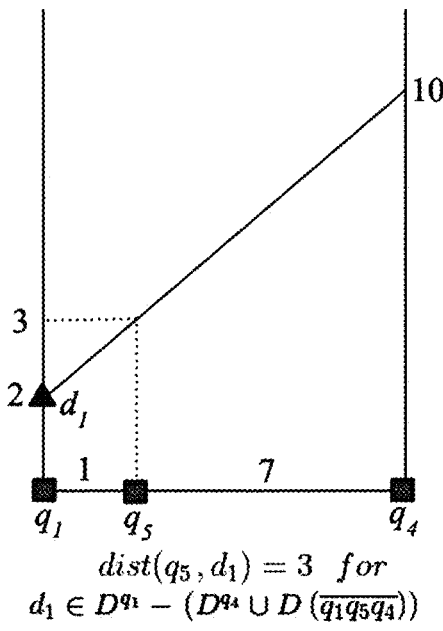
Figure 9B:
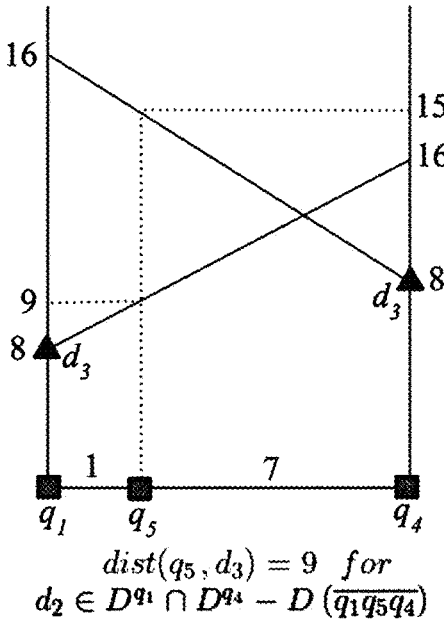

In addition, in the embodiment of the present disclosure, in order to bypass the redundant NN query evaluation, a simple heuristic in which the NN query is not calculated at a query point close to an end node is selected, as shown in FIG. 7. FIG. 7 illustrates a heuristic $D^q \subseteq D^{q_j} \cup D(\overline{n_2q_j})$ for each query segment $q \in \overline{q_iq_j}$. A query cluster $\overline{q_jq_1}$ ending with an endpoint node $n_1$, is composed of an adjacent intersection node $n_2$. Here, an NN query at a query object $q_i$, which has $D^q \subseteq D^{q_j} \cup D(\overline{n_2q_j})$, is not needed, and only the evaluation of an NN query at a query object $q_j$ is sufficient.

As in FIG. 4B, query objects are clustered into $\overline{q_1q_5q_4}$, $\overline{q_2q_3}$, and $\overline{q_6}$. While processing the query cluster $\overline{q_1q_5q_4}$, which includes query objects $q_1,q_5,q_4$, two NN queries are evaluated at query objects $q_1,q_4$, and the closest data objects related to the query objects $q_1,q_4$ are searched for. After evaluating the NN queries at the two endpoints of the query object cluster, the control unit 250 obtains $d_1$ at $D^{q_1}=$, $d_3$ at $D^{q_4}$ and $\theta$ at $D(\overline{q_1q_5q_4})$.

The control unit 250 may, based on the information obtained as above, generate a partial join result set of $\{q_1,d_1\}$ for $q_1$ and $\{q_4,d_3\}$ for $q_4$. In addition, instead of evaluating an NN query for $q_5$, which is an inner query object within a query object cluster $\overline{q_1q_5q_4}$, the control unit 250 may retrieve an NN query for $q_5$ based on a relation $D^{q_1} \cup D^{q_4} \cup D(\overline{q_1q_5q_4})$. To this end, the distance between $q_5$ and a candidate data object $d \in (d_1,d_3)$ needs to be calculated. With $d_1 \in D^{q_1} \cup D^{q_4}-D(\overline{q_1q_5q_4})$, the distance between $q_5$ and $d_1$ is $dist(q_5,d_1)=len(q_5,q_1)+dist(q_1,d_1)=3$, which may be represented as FIG. 9A. Similarly, referring to FIG. 8, with $d_3 \in D^{q_1} \cup D^{q_4}-D(\overline{q_1q_5q_4})$, the distance between $q_5$ and $d_3$ may be represented as $dist(q_5,d_3)=min\{len(q_5,q_1)+dist(q_1,d_3),len(q_5,q_4)+dis(q_4,d_1)=min\{9,15\}$ as in FIG. 9B.

The control unit 250 evaluates an NN query on the query object cluster $\overline{q_2q_3}$. Since the query object cluster is composed of only two query objects, the control unit 250 evaluates NN queries corresponding to the two query objects. When searching for a set of the closest data objects, the control unit 250 generates a partial join result set for each of the query objects. As in Table 8, in the case of $D^{q_2}=\{d_4\}$, $D^{q_5}=\{d_4\}$, the partial join result sets for q2 and q3 may be generated as $\{q_2,d_4\}$ and $\{q_3,d_4\}$, respectively.

The NN queries from the query object cluster $\overline{q_2q_3}$ are connected to a final query point $q_6$. In this case, a single NN query is generated at $q_6$ and the partial join set for $q_6$ is calculated as $\{q_6,d_3\}$. Finally, the union of all query object clusters may be provided as $\{q_4,d_3\},\{q_5,d_1\}$, $\{q_2,d_4\}$, $\{q_3,d_4\}$, and $\{q_6,d_3\}$.

As described above, the method and apparatus for providing an LBS in a dynamic road network can ensure minimum overhead and cost when calculating a shortest path in a dynamic road network in which a moving distance and a moving time vary according to various traffic conditions.

Embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Specific embodiments are shown by way of example in the specification and the drawings and are merely intended to aid in the explanation and understanding of the technical spirit of the present disclosure rather than limiting the scope of the present disclosure. Those of ordinary skill in the technical field to which the present disclosure pertains should be able to understand that various modifications and alterations may be made without departing from the technical spirit or essential features of the present disclosure.

What is claimed is:

1. A method of providing a location-based service (LBS), the method comprising:
according to an LBS request signal received from a plurality of user terminals, generating query objects based on location information of the plurality of user terminals; searching for at least one data object located within a threshold radius of one of the plurality of user terminals;
generating a cluster including the query objects corresponding to a node sequence, wherein the query objects are defined into two classes:
boundary query objects, each of which is located at a boundary, and
an inner query object, which is located between the boundary query objects;
determining first data objects, among the at least one data object, for the boundary query objects based on a nearest neighbor (NN) algorithm;
determining a second data object for the inner query object, the second data object being assigned as one of the first data objects whose corresponding boundary query object is nearest to the inner query object;
calculating a first distance from the inner query object to the assigned second data
object, the first distance being calculated by adding a second distance and a first length for a first condition, wherein the second distance is the shortest-path distance between the second data object and the corresponding boundary query object, and wherein the first length is a distance of a line segment connecting the corresponding boundary query object and the inner query object, wherein the first condition is defined such that the assigned second data object is a member of a set of data objects closest to one of the boundary query objects; and
transmitting the first data objects, the second data object and the first distance to respective user terminals,
wherein determining the second data object comprises:
identifying a number of query objects included in the query object cluster;
when the identified query object includes a plurality of query objects, calculating partial join result sets for each of the plurality of query objects; and
performing a union on the calculated partial join result sets to calculate the nearest neighbor, and
wherein generating the query objects comprises:
acquiring a snapshot of a road network within a threshold radius based on a location of one of the plurality of user terminals according to the LBS request signal.

2. The method of claim 1, wherein generating the cluster comprises:
searching a road network of a road on which one of the plurality of user terminals is located; and generating one or more node clusters based on an intermediate node other than an intersection node or an end node according to a result of searching the road network.

3. The method of claim 2, wherein generating the cluster further comprises:
grouping the query objects located in the same node cluster among the node clusters, to generate a query object cluster.

4. The method of claim 1, wherein each of the first data objects and the second data object corresponds to a vehicle terminal.

5. An apparatus for providing a location-based service (LBS), the apparatus comprising:
a communication unit configured to receive an LBS request signal from a plurality of user terminals; and
a control unit configured to:
generate query objects based on location information of the plurality of user terminals, search for at least one data object located within a threshold radius of one of the plurality of user terminals,
generate a cluster including the query objects corresponding to a node sequence, wherein the query objects are defined into two classes:
boundary query objects, each of which is located at a boundary, and
an inner query object, which is located between the boundary query objects, determine first data objects, among the at least one data object, for the boundary query objects based on a nearest neighbor (NN) algorithm,
determine a second data object for the inner query object, the second data object being assigned as one of the first data objects whose corresponding boundary query object is nearest to the inner query object,
calculate a first distance from the inner query object to the assigned second data object, the first distance being calculated by adding a second distance and a first length for a first condition, wherein the second distance is the shortest-path distance between the second data object and the corresponding boundary query object, and wherein the first length is a distance of a line segment connecting the corresponding boundary query object and the inner query object wherein the first condition is defined such that the assigned second data object is a member of a set of data objects closest to one of the boundary query objects, and
transmit, through the communication unit, the first data objects, the second data object and the first distance to respective user terminals, wherein the control unit is further configured to,
identify a number of query objects included in the query object cluster,
when the identified query object includes a plurality of query objects, calculate partial join result sets for each of the plurality of query objects; and
perform a union on the calculated partial join result sets to calculate the nearest neighbor, and
wherein the control unit is further configured to acquire a snapshot of a road network within a threshold radius based on a location of one of the plurality of user terminals according to the LBS request signal.

6. The apparatus of claim 5, wherein the control unit is further configured to search a road network of a road on which one of the plurality of user terminals is located, and to generate one or more node clusters based on an intermediate node other than an intersection node or an end node.

7. The apparatus of claim 6, wherein the control unit is further configured to group the query objects located in the same node cluster among the node clusters, and to generate a query object cluster.

8. The apparatus of claim 5, wherein each of the first data objects and the second data object corresponds to a vehicle terminal.

* * * * *